United States Patent [19]

King

[11] Patent Number: 4,512,600

[45] Date of Patent: Apr. 23, 1985

[54] COLLAPSIBLE STRUT WITH PIVOT JOINT CONNECTOR

[75] Inventor: Shaylor E. King, Elkhart, Ind.

[73] Assignee: QMP, Inc., Elkhart, Ind.

[21] Appl. No.: 574,720

[22] Filed: Jan. 30, 1984

[51] Int. Cl.³ ............................................. E05C 17/30
[52] U.S. Cl. .................................. 292/338; 403/166; 403/56
[58] Field of Search .................. 403/166, 56; 292/338, 292/339

[56] References Cited

U.S. PATENT DOCUMENTS

| | | | |
|---|---|---|---|
| 2,238,870 | 4/1941 | Haynes | 403/56 X |
| 3,711,892 | 1/1973 | Tabor | 292/338 X |
| 4,199,179 | 4/1980 | Curry | 292/338 |
| 4,215,885 | 8/1980 | McCray | 292/338 |

Primary Examiner—Andrew V. Kundrat
Attorney, Agent, or Firm—James D. Hall

[57] ABSTRACT

A novel pivot joint connector for a strut assembly which utilizes a pivot ball and socket construction in conjunction with a clip to insure a smooth operating environment and ease of assembly.

2 Claims, 6 Drawing Figures

U.S. Patent    Apr. 23, 1985    4,512,600
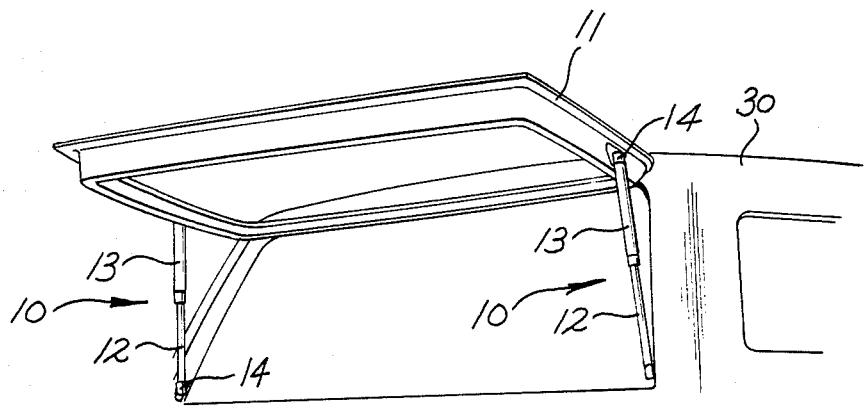
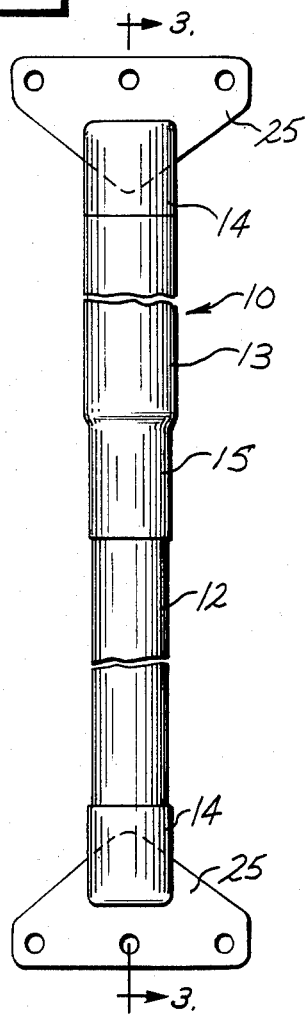
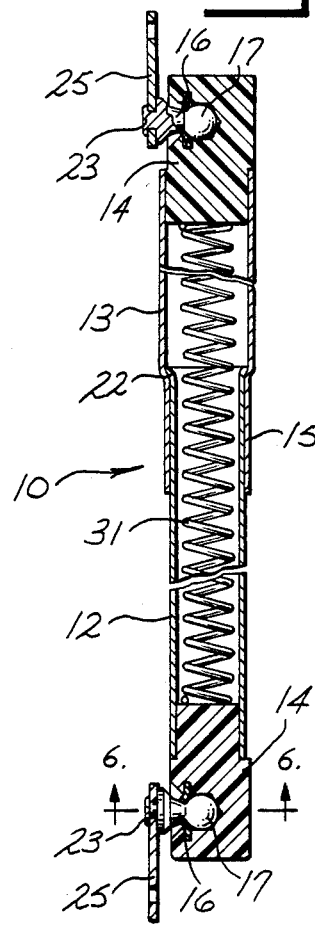
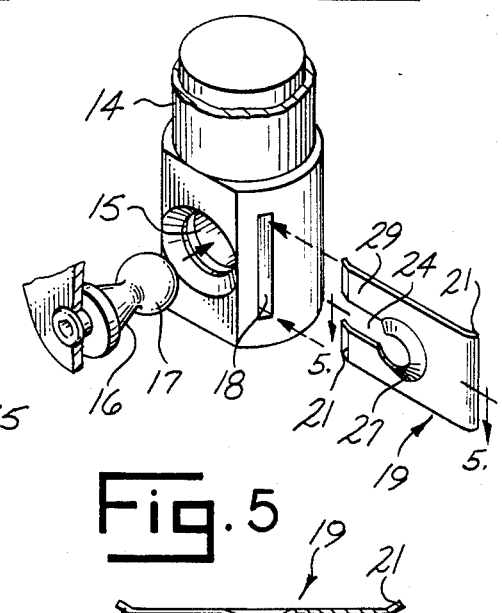
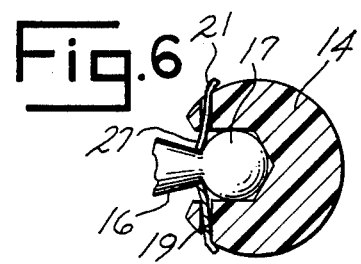

COLLAPSIBLE STRUT WITH PIVOT JOINT CONNECTOR

SUMMARY OF THE INVENTION

This invention relates to an improved collapsible strut assembly having a unique pivot joint connector for attaching the assembly to a support.

Heretofore, strut assembly pivot points were primarily of two forms, namely: (1) a ball and aperture design and (2) a pin and eyelet design. However, a problem with these pivot designs is that they both permit an inordinate amount of play, thereby limiting their functionality and reliability.

This invention provides for a pivot joint which augments the functionality and reliability of the strut assembly by maintaining a high degree of mobility in addition to eliminating much of the play. The pivot joint includes a ball and socket arrangement within an end plug member located at the end of extendable telescoping tubes of the strut assembly. A clip is inserted into the end plug member to overlie and capture the pivot ball to insure a snug fit.

Accordingly, it is an object of this invention to provide a strut assembly with a novel pivot joint.

Another object of this invention is to provide for a pivot joint of a strut assembly which enhances functionality.

Another object of this invention is to provide for a pivot joint which can be easily assembled and economically produced.

Other objects will become apparent upon a reading of the following description.

BRIEF DESCRIPTION OF THE DRAWINGS

FIG. 1 is a perspective view of the strut assembly in use.

FIG. 2 is a fragmented elevational view of the strut assembly.

FIG. 3 is a longitudinal sectional view taken along line 3—3 of FIG. 2.

FIG. 4 is an exploded view of an end member of the strut assembly.

FIG. 5 is a cross sectional view taken along line 5—5 of FIG. 4.

FIG. 6 is a cross sectional view taken along line 6—6 of FIG. 3.

DESCRIPTION OF THE PREFERRED EMBODIMENT

The preferred embodiment herein described is not intended to be exhaustive or to limit the invention to the precise form disclosed. It is chosen and described to best explain the principles of the invention and its application and practical use to thereby enable others skilled in the art to utilize the invention.

The strut assembly 10 as seen in FIG. 1 is adapted to support a variety of loads through a unique pivotal joint which employs a pivot ball and socket arrangement. Such an arrangement is particularly suited for use with a tailgate or hatchback 11 of an automobile 30. A spring work medium is illustrated, however, it is to be understood that a gaseous work medium (not shown) may be employed within the strut assembly.

Strut assembly 10 includes inner and outer telescoping tubes 12 and 13 enclosed by end members 14. The inner end portion 15 of tube 13 is of reduced diameter so as to form an abutment with flared end 22 of tube 12 to prevent separation of the tubes when in a fully extended position. The diameter of each end member 14 is slightly reduced so as to facilitate engagement with tubes 12 and 13. End members 14 may be connected to tubes 12, 13 in any one of several ways, such as by transverse pins or by the use of adhesives. Housed within tubes 12 and 13 is a helical spring 31 which abuts end member 14 to provide the extension force for the strut assembly. At each end member 14, there is a pivot joint 23 which serves to connect an attachment or connector bracket 25 to the remainder of the assembly. Brackets 25 are used to attach the strut assembly 10 to a support, such as the frame of automobile 30.

Pivot joints 23 provide a smooth operating environment for strut assembly 10 while increasing the mobility of the strut and maintaining its ease of manufacturability. Each pivot joint 23 includes an end member 14, a pivot ball 17 and an integral shank 16 which extends from the ball, and a clip 19. A socket 15 is formed in end member 14 and receives pivot ball 17. Socket 15 is only slightly larger in transverse dimension than pivot ball 17 in order to eliminate much of the play while maintaining mobility. Pivot ball 17 is attached at shank 16 to bracket 25. End members 14 may be formed out of teflon or other materials with similar low friction characteristics. A transverse slot 18 is formed in end member 14 which intersects socket 15 at the location of pivot ball 17 just below shank 16 when the ball is fully seated within the end member socket. Clip 19 is preferably formed of a resilient material and includes an offset center 27 of truncated shape intersected by a slot 24 which extends to one end of the clip. Each end of clip 19 is downturned to form tabs 21 which extend in an opposite direction of offset center 27.

Each pivot joint 23 is assembled by first inserting pivot ball 17 into the socket 15 of an end member 14. Clip 19 is then inserted in slotted end first into end member slot 18 and slid around shank 16 with its sides 29 straddling the shank until the offset center 27 of the clip is brought to rest on top of pivot ball 17, as best seen in FIG. 6. The prevention of unnecessary ball-in-socket play is the result of unique characteristics of clip 19. Tabs 21 of clip 19 at its slotted end overlay the side of end member 14 to retard withdrawal of the clip with the clip assuming a flexed orientation which serves to urge the ball into socket 15.

It is to be understood that the invention is not limited to the details above given and that it may be modified within the scope of the appended claims.

What I claim is:

1. A collapsible strut assembly having first and second shiftable telescopic tube members, said tube members being shiftable between extended and retracted positions, yieldable means for normally urging said tube members into their said extended position, an end member secured to one of said tube members, a socket formed in said end member, a pivot member having a ball connected to a shank, said pivot member ball fitted within said end member socket with said pivot member being pivotable relative to said end member, and a plate member connected to said pivot member shank and adapted for attachment to a support, said end member having a slot intersecting said end member socket at the location of said pivot member ball, a clip member fitted through said end member slot and overlying and contacting said pivot member ball to secure the ball within said end member socket, said clip member being formed of a resilient material and contacting said pivot member ball for urging the ball into the end member socket, said clip member being slotted from one end to define sides, said clip member sides straddling said pivot member shank, the improvement wherein said clip member includes tabs at its said one end overlying said end member.

2. The strut assembly of claim 1 wherein said end member slot extends through the end member from one side to the other side of the end member, said clip member tabs overlying a said side of said end member.

* * * * *